United States Patent [19]

McGrady et al.

[11] Patent Number: 5,022,393

[45] Date of Patent: Jun. 11, 1991

[54] APPARATUS FOR WARNING A PILOT OF LIFE-SUPPORT SYSTEM FAILURES

[75] Inventors: Michael B. McGrady, Federal Way; Jon K. Robinson, Bellevue, both of Wash.

[73] Assignee: The Boeing Company, Seattle, Wash.

[21] Appl. No.: 257,625

[22] Filed: Oct. 14, 1988

[51] Int. Cl.$^5$ .............................................. A62B 7/00
[52] U.S. Cl. .......................... 128/205.23; 128/204.21
[58] Field of Search ..................... 128/202.13, 202.16, 128/202.22, 204.18, 204.21, 204.29, 201.24, 201.28, 202.11, 205.23; 244/118.5, 121, 122 AG; 340/955, 973, 461, 525, 705, 762, 782; 98/1.5

[56] References Cited

U.S. PATENT DOCUMENTS

| | | |
|---|---|---|
| 2,302,023 | 11/1942 | Glasser . |
| 2,652,830 | 9/1953 | Koza et al. . |
| 2,934,293 | 4/1960 | Boehme et al. . |
| 3,016,061 | 1/1962 | Maddock . |
| 3,103,927 | 9/1963 | Henneman et al. ............ 128/201.28 |
| 3,215,057 | 11/1965 | Turek . |
| 3,410,191 | 11/1968 | Jackson ........................... 244/118.5 |
| 3,587,438 | 6/1971 | Foster et al. . |
| 3,720,501 | 3/1973 | Cramer et al. . |
| 3,981,300 | 9/1976 | Williams ......................... 128/202.26 |
| 4,057,205 | 1/1977 | Vensel . |
| 4,109,509 | 8/1978 | Cramer et al. . |
| 4,149,148 | 4/1979 | Miller et al. ......................... 340/973 |
| 4,163,387 | 8/1979 | Schroeder .......................... 340/973 |
| 4,164,899 | 8/1979 | Burgess ................................ 98/1.5 |
| 4,428,372 | 1/1984 | Beysel et al. .................... 128/202.26 |
| 4,501,293 | 2/1985 | Furlong et al. . |
| 4,553,474 | 11/1985 | Wong et al. ........................... 98/1.5 |
| 4,635,030 | 1/1987 | Rauch ................................ 340/973 |
| 4,648,397 | 3/1987 | Beale . |
| 4,651,728 | 3/1987 | Gupta . |
| 4,687,013 | 8/1987 | Stevenson . |
| 4,845,495 | 7/1989 | Bollard et al. ...................... 340/973 |
| 4,870,960 | 10/1989 | Hradek ........................... 128/204.18 |

Primary Examiner—Edgar S. Burr
Assistant Examiner—Aaron J. Lewis
Attorney, Agent, or Firm—Seed and Berry

[57] ABSTRACT

An improved apparatus and method are provided for warning a pilot of life-support system failures wherein the life-support system includes at least a pressurization system and a breathing gas supply system. The breathing gas supply system which is contemplated in the presently preferred embodiment of the invention is the type wherein breathing gas may be supplied to the pilot from a plurality of on-board sources. The apparatus which is the subject of the present invention is responsive to both the operating conditions of the pressurization system and the breathing gas supply system to provide minimum warnings to the pilot thereby to improve the effectiveness of the warnings. The apparatus includes a plurality of indicators which, during normal operation, are substantially invisible to the pilot. The indicators are illuminated under certain variable conditions of the pressurization system and the breathing gas supply system. Further, a portion of the indicators may be illuminated in first and second formats whereby each format is indicative of a different priority emergency.

26 Claims, 8 Drawing Sheets

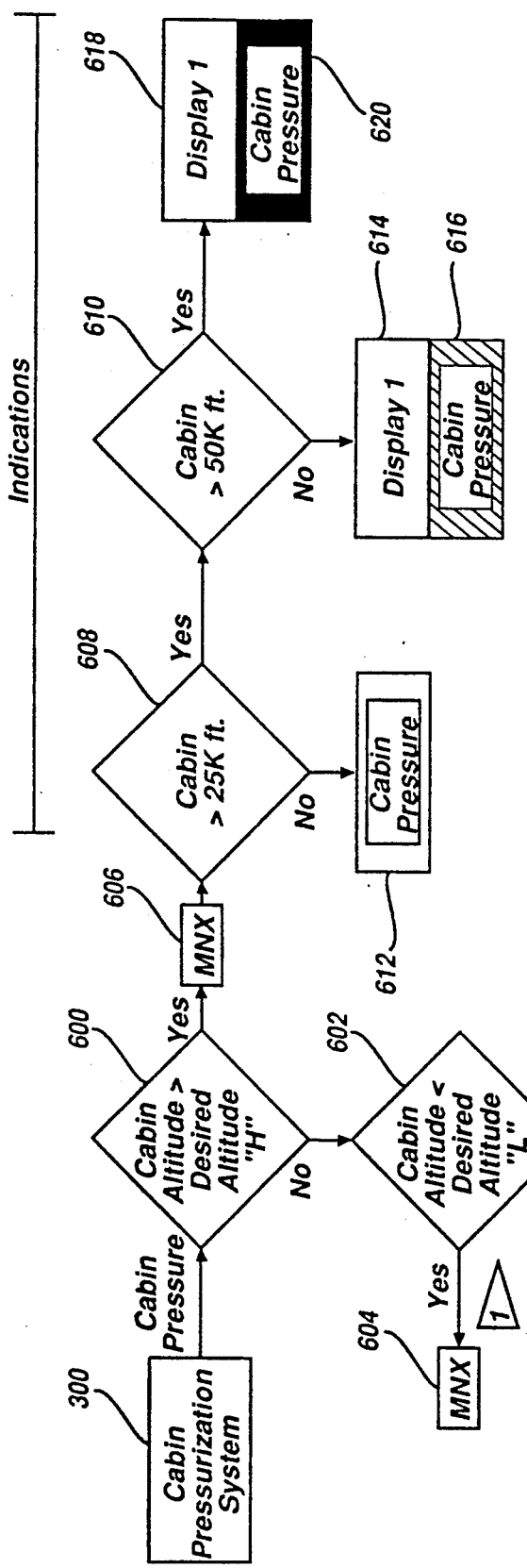
Figure 6a
Figure 6b

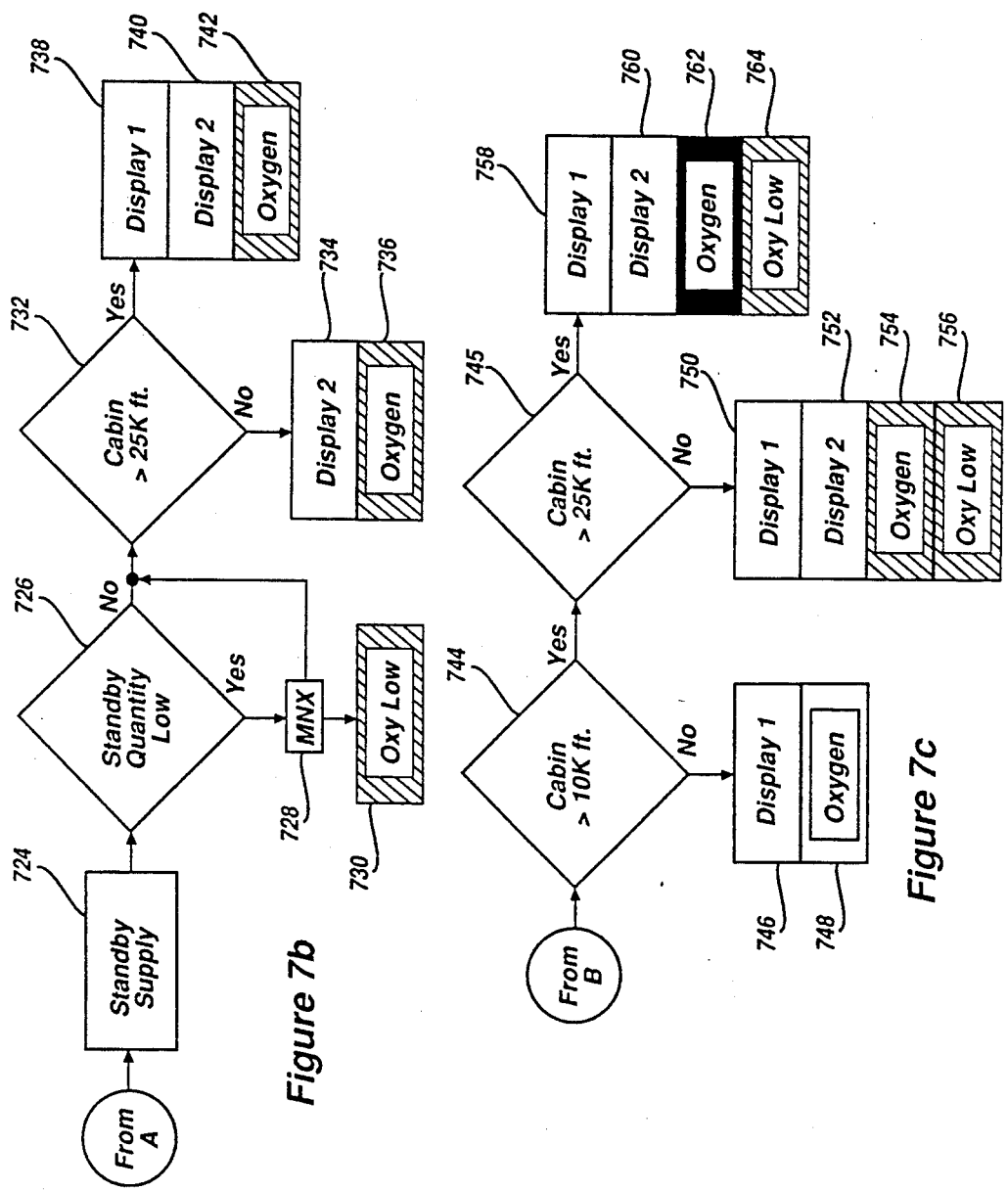

APPARATUS FOR WARNING A PILOT OF LIFE-SUPPORT SYSTEM FAILURES

DESCRIPTION

1. Technical Field

The present invention is directed toward life-support system indicators and, more particularly, toward improved apparatus for warning the pilot of an aircraft of life-support system failures.

2. Background of the Invention

The aircraft industry continues to improve the speed, attainable altitude and overall performance of military and commercial aircraft. As the performance of the aircraft is improved, so must the performance of life-support systems be improved as well as the performance of indicators provided to warn the pilot of life-support system failures.

The major life-support systems of an aircraft include a pressurization system and an oxygen-supply system. The pressurization system is adapted to maintain the cabin of the aircraft at predetermined pressure levels so that the effective altitude of the aircraft cabin is substantially less than the actual altitude of the aircraft. Pressurization of the cabin in this manner maintains oxygen-rich air within the cabin as well as prevents unwanted physiological effects on the pilot which may result from a low-pressure, low-oxygen environments.

The oxygen-supply system is adapted to supply oxygen to the pilot during high altitude flying and/or times when the pressurization system is malfunctioning. The oxygen-supply system typically includes a plurality of sources from which oxygen may be supplied to the pilot. The primary source of oxygen for the pilot comprises the on-board oxygen generation system (OBOGS) which is adapted to generate concentrated oxygen from cabin air or air outside the aircraft. So long as the on-board oxygen generation system is operational, it may provide an endless supply of oxygen to the pilot. A second source of oxygen upon which the pilot may rely is a standby oxygen supply. The standby oxygen supply typically comprises a stored quantity of oxygen. The pilot may be required to switch to this supply, or may be automatically switched to this supply by the life-support system, at times when the on-board oxygen generation system is not functional. Of course, the pilot may always breathe cabin air as a third source of oxygen.

Prior art systems for warning the pilot of life-support system malfunctions provide only dials which show the operational status of the pressurization system, the operational status of the on-board oxygen generation system or the quantity of standby oxygen available. Since these prior art indicators are constantly displayed, the pilot may or may not notice a change in the status of these indicators during a critical time period. Accordingly, it is desirable to provide life-support system warning apparatus which insures that the pilot will notice a critical change in the operational status of the life support system.

Further, there exists a relationship between the operational status of the pressurization and oxygen-supply systems and the action which must be taken by the pilot. As an example, at times when the on-board oxygen generation system is malfunctioning, the operational status of the pressurization system and the amount of oxygen remaining in the standby oxygen supply will determine whether the pilot should use the standby supply or breathe cabin air. Therefore, it is also desirable to provide a system which will provide an indication to the pilot of any action which is necessary in response to the operational status of both the pressurization and oxygen-supply systems.

Since the improved performance of the aircraft requires split-second reaction time from the pilot, it is essential the pilot notice any condition which requires immediate action. In addition, it is essential that the action required of the pilot, in light of the operational status of the pressurization and oxygen-supply systems, be immediately apparent Accordingly, it is desirable to provide a system which ensures the pilot is notified of any change in status of the life-support system which requires immediate pilot action as well as the action which is required.

SUMMARY OF THE INVENTION

It is therefore an object of the subject invention to provide improved apparatus for indicating the status of the life-support systems of an aircraft.

It is a further object of the present invention to provide life support system status display apparatus which is responsive to the combination of each component of the life-support system to provide specific warning information to the pilot of the aircraft dependent upon the combined status of these components.

It is a further object of the present invention to provide life-support system status indication apparatus which is adapted to indicate critical status conditions in a manner which is designed to ensure observation by the pilot.

It is a still further object of the invention to provide life-support warning apparatus which notifies the pilot of critical changes in the operational status of the life-support system as well as any action which is necessary on the part of the pilot.

These and other objects of the invention are met by providing novel apparatus for warning the pilot of any failure in the aircraft life-support system, wherein the life-support system includes at least first and second oxygen sources and a pressurization system. The warning apparatus includes a multifunctional display for selectively providing a plurality of display indicators in response to the operational status of the life-support system. The multifunctional display is further adapted to provide at least one of the display indicators in a plurality of display formats.

More particularly, the multifunctional display system may include memory for storing program and control data. The program data is responsive to the life-support system to determine when one or more of the plurality of display indicators are to be displayed and to determine when and in what format the indicators are to be displayed. As an example, the multifunctional display system may be adapted to determine whether oxygen is being supplied to the pilot from the first oxygen source and, if so, to selectively display a portion of the display indicators, which relate to the first oxygen source, in accordance with a first portion of the program data.

BRIEF DESCRIPTION OF THE DRAWINGS

Apparatus which is considered to be invention is particularly pointed out and distinctly claimed in the numbered paragraphs appended hereto. The invention, however, both as to organization and method of practice, may best be understood by reading the following detailed description thereof taken in conjunction with the drawings in which:

FIG. 6a is a flow chart illustrating software for providing visual indications to a pilot;

FIG. 6b is an illustration of the varying formats in which the indicators may be displayed;

FIGS. 7a, 7b and 7c are flow charts illustrating software for providing system status information to the pilot.

DETAILED DESCRIPTION OF THE INVENTION

Figure 1:
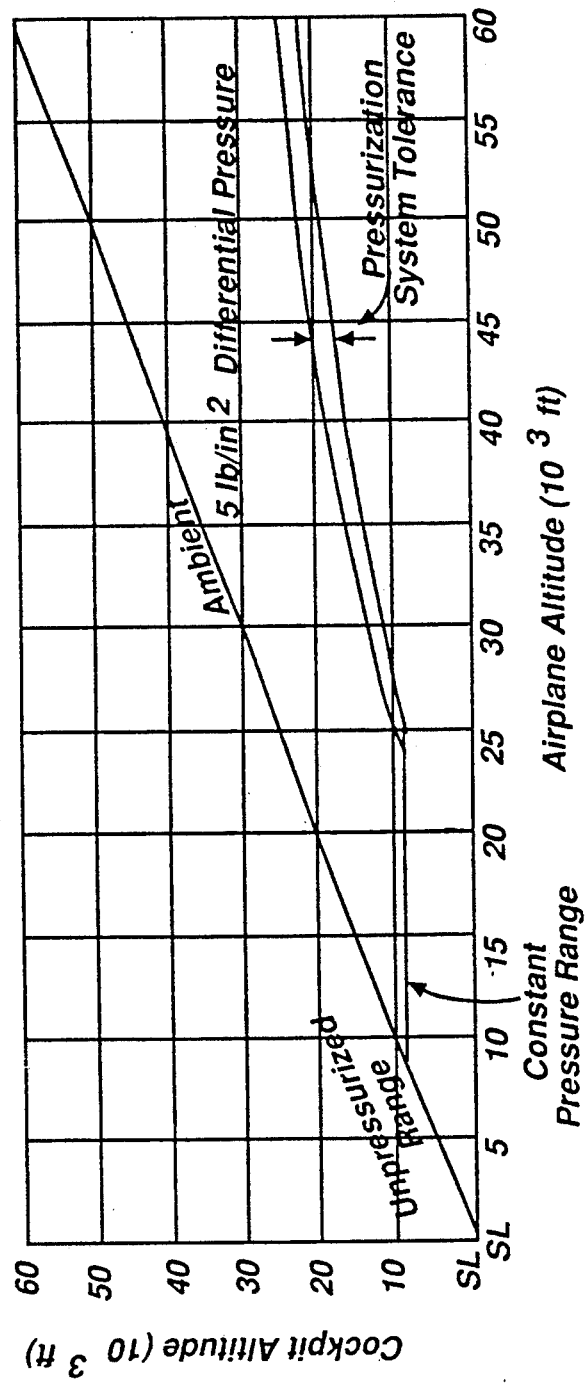
FIG. 1 is a graph illustrating the desired cockpit pressurization as a function of the altitude of the airplane.

The present invention comprises apparatus for selectively providing indicators to the pilot of an aircraft to thereby apprise the pilot of the operational status of his life-support systems. As is known, the oxygen content and pressurization at high altitudes affect the physiological condition of the aircraft pilot. To compensate for these adverse effects, the cabin of the aircraft is typically pressurized to maintain an oxygen partial pressure that is equal to the oxygen partial pressure at a relatively low altitude. The graph of FIG. 1 illustrates the desired pressurization of the aircraft as a function of the airplane altitude. The graph of FIG. 2 illustrates the desired oxygen content of breathing air also as a function of the aircraft altitude.

Figure 2:
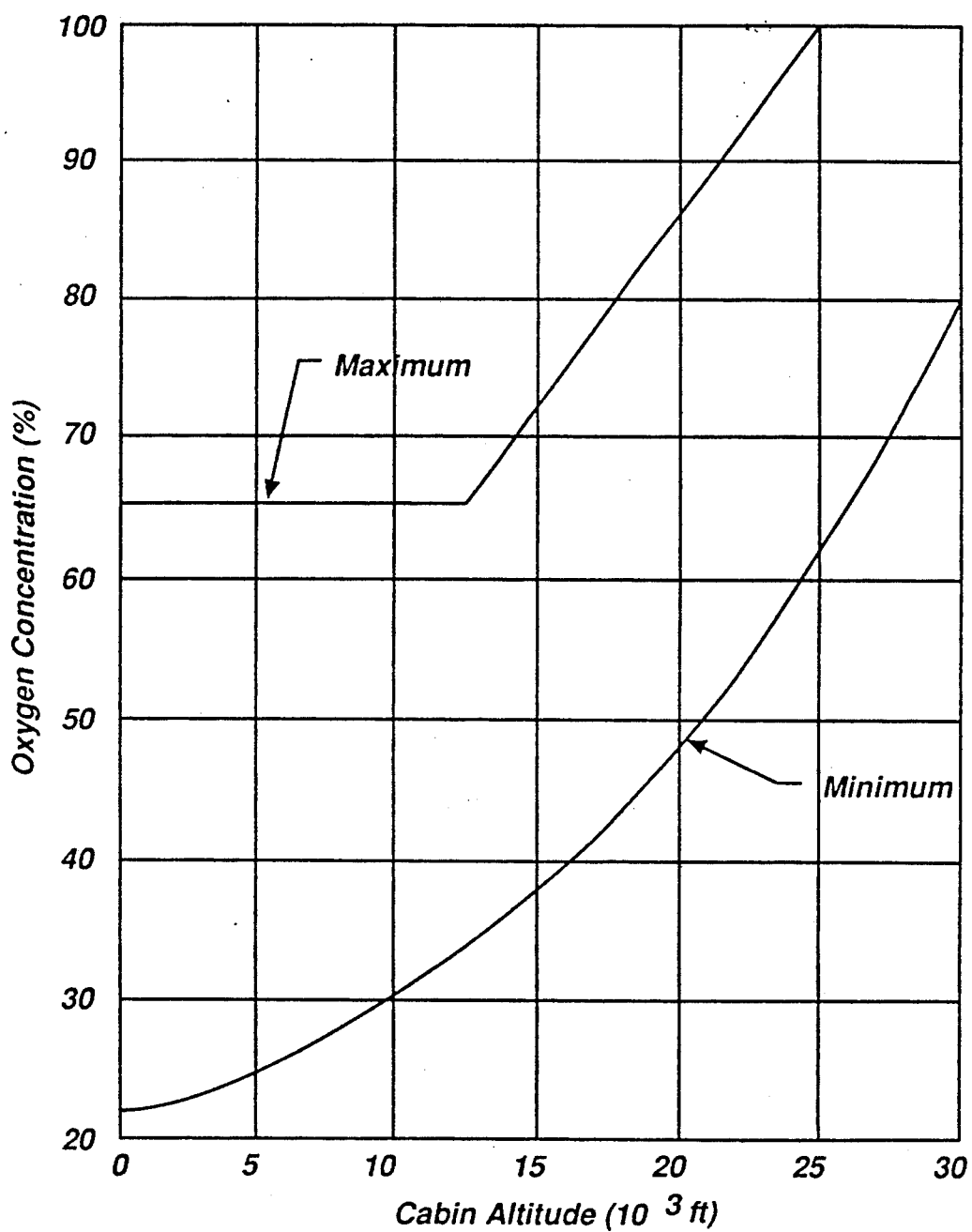
FIG. 2 is a graph illustrating the desired oxygen concentration to be supplied to the pilot as a function of the altitude of the aircraft.
Figure 3:
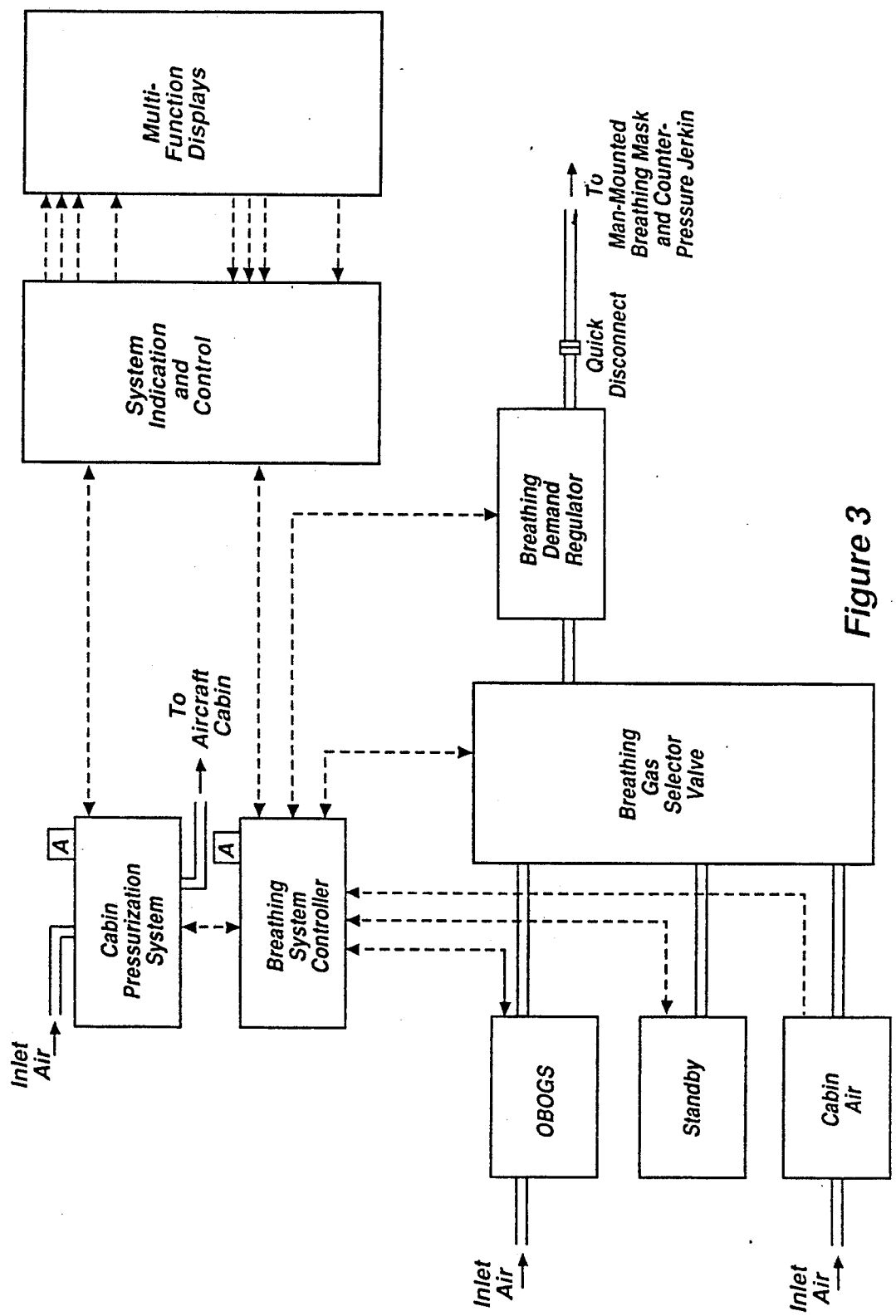
FIG. 3 is an illustrative block diagram of apparatus which is a portion of the invention.

The apparatus for maintaining the desired pressurization and oxygen concentration levels shown in FIGS. 1 and 2 is illustrated in FIG. 3. Therein, a cabin pressurization system 300 is provided for pressurizing inlet air to provide outlet air to the aircraft cabin. The cabin pressurization system 300 includes a conventional altitude sensor 302 which provides the altitude of the aircraft as input to the cabin pressurization system 300 thereby to determine the proper pressurization of the aircraft cabin. The cabin pressurization system 300 is responsive to the altitude sensor 302 to pressurize the cabin in accordance with the graph of FIG. 1. The cabin pressurization system 300 is further adapted to determine the cabin pressure and provide a signal that is indicative of the pressurization of the cabin. That is, at an altitude where the atmospheric pressurization is approximately 40,000 feet, the cabin pressurization system 300 operates to pressurize the cabin to a pressurization of between 15,000 feet and 18,000 feet.

The system of FIG. 3 further includes a conventional breathing system controller 304 which is responsive to a second altitude sensor 306 for controlling the oxygen concentration of the breathing gas that is provided to the aircraft pilot in accordance with the graph of FIG. 2.

The breathing system controller 304 is adapted to provide breathing gas to the pilot from one of three sources. An on-board oxygen generation system (OBOGS) 308 is provided for generating oxygen having the desired concentration as determined by the graph of FIG. 2. The on-board oxygen generation system 308 comprises conventional apparatus for concentrating oxygen from inlet air to provide concentrated oxygen as its output. A standby oxygen source 310 is also provided for storing a quantity of oxygen or high-oxygen concentration gas. In practice, the standby oxygen source 310 typically provides a canister or other limited quantity of oxygen which may be used as a "get me down" oxygen source at times when the on-board oxygen generation system 308 has malfunctioned. Additionally, oxygen may be provided to the pilot from the cabin of the aircraft as indicated by the cabin air supply 312.

The breathing system controller 304 monitors the on-board oxygen generation system 308 to determine its functional status and monitors the standby oxygen supply 310 to determine the quantity of oxygen remaining therein. As will be described in more detail below, the on-board oxygen generation system is monitored to determine: (1) whether it is receiving input power (electricity in the presently preferred embodiment of the invention); (2) whether the pressure at which its output breathing gas is being supplied is above a predetermined minimum value; and (3) whether the percentage of oxygen in the output of the breathing gas is within the tolerance range specified by FIG. 2. If either of the foregoing quantities is below tolerance, the on-board oxygen generation system is considered to have failed.

In response to a failure of the on-board oxygen generation system 308, and assuming oxygen remains in the standby oxygen source 310, the breathing system controller 304 will control a breathing gas selector valve 314 to change the source of breathing gas being supplied to the pilot from the on-board oxygen generation system 308 to the standby oxygen source 310. The breathing gas selector valve 314 is responsive to the breathing system controller 304 to select between the three oxygen sources 308–312, which three sources 308–312 comprise the input to the selector valve 314, to provide breathing gas from one source as its output.

The output of the breathing gas selector valve 314 is provided to a breathing demand regulator 316. The breathing demand regulator is a conventional device which supplies breathing gas to the pilot in accordance with the breathing demand of the pilot. The breathing demand regulator 316 is coupled to the mask of the pilot via a quick disconnect mechanism 318 which is provided for allowing the pilot to quickly disconnect his breathing apparatus for emergency exits from the aircraft.

The cabin pressurization system 300 and breathing system controller 304 can be readily provided by those skilled in the art in accordance with the description thereof provided herein. The altitude sensors 302, 306, on-board oxygen generation system 308, standby oxygen source 310, breathing gas selector valve 314, breathing demand regulator 316 and quick disconnect coupler 318 are each conventional devices which are readily available to those skilled in the art.

The cabin pressurization system 300 and breathing system controller 304 are each coupled to a system indication and control processor 320, which may be a conventional microprocessor. The system indication and control processor 320 is in turn coupled to conventional multifunctional displays 322. The system indication and control processor 320 and multifunctional displays 322 cooperate to selectively provide warnings to the pilot to apprise the pilot of the operational status of the cabin pressurization system 300 and breathing system controller 304.

The system indication and control processor 320 is coupled to an altitude sensor 324 to receive necessary altitude information therefrom. Like the altitude sensors 302 and 306, the altitude sensor 324 may comprise a conventional device. Further, as will be apparent to those skilled in the art, the altitude sensors 302, 306 and 324 may comprise a single sensor coupled in parallel to the cabin pressurization system 300, the breathing system controller 304 and the system indication and control processors 320.

Typically, the multifunctional displays 322 may comprise a quantity indicator for indicating, on a substantially continuous scale, a predetermined quantity. With respect to FIGS. 4 and 5, the multifunctional displays 322 may comprise a quantity indicator such as indicator 400 for indicating the pressurization of the cabin (FIG. 4) and indicator 500 for indicating the quantity of oxygen remaining in the standby oxygen source 310. Each indicator 400 and 500 includes a dial 402 and 502, respectively, which cooperates with a continuous scale 404 and 504 for indicating the respective quantity. In the presently preferred embodiment of the invention, each quantity indicator 400 and 500 comprises a digital quantity indicator which includes a plurality of pointers 402 and 502 adapted to be individually illuminated at various positions along the respective dials 404 and 504. By illuminating any one of the plurality of pointers 402 or 502, the indicator will provide an indication of the respective quantity. The preferred indicators are referred to herein as digital quantity indicators.

It will be apparent to those skilled in the art that a variety of digital quantity indicators may be substituted for indicators 400 and 500 described herein, e.g., bar-type digital indicators, for providing the quantity indication as described herein. Further, analog quantity indicators such as coil-type deflection indicators may also be substituted for the preferred digital quantity indicators. A particularly advantageous feature which results from using the digital quantity indicator, however, is that the indicators may be selectively illuminated (that is, they may be substantially invisible unless illuminated), as will be described in more detail below.

The multifunctional displays 322 further comprise a plurality of light indicators which may be selectively illuminated to thereby indicate the presence of a predetermined emergency condition. As an example, one light display indicator which is contemplated with the present invention contains the caption "OXY LOW" and is illuminated to indicate that little oxygen remains in the standby oxygen source 310. The light indicators of the present invention may be illuminated in a plurality of display formats wherein each format is indicative of the relative criticality of the emergency. In the presently preferred embodiment of the invention, the light indicators may be provided in a plurality of color formats, i.e., white, amber and red, wherein red is an emergency condition, amber a caution condition and white indicates an advisory condition. Accordingly the red format, i.e., the emergency condition format, indicates that the pilot's life is endangered or loss of the aircraft is at risk. The amber format, i.e., the caution condition format, indicates a critical failure that risks harming the pilot or damage to the aircraft. And the white format, i.e., advisory condition format, indicates a non-critical failure of the life-support system. Other manners of altering the display format may be provided, e.g., the size or shape of an indicator could be altered, an indicator could intermittently illuminate at varying intervals, etc.

The multifunctional displays 322 comprise conventional devices which are readily available to those skilled in the art. The system indication and control processor 320 comprises a plurality of conventional electronic components constructed for controlling the multifunctional displays 322 in response to program information provided to the systems indication and control processor 320 as well as status signals provided from the cabin pressurization system 300 and breathing system controller 304. The system indication and control processor 320 may comprise a microprocessor as well as other and known peripheral circuitry, e.g., buffers, latches, input/output devices, memory, timers, multiplexers, amplifiers, etc., for implementing the method described below. Other conventional components may be arranged for implementing the method described herein to control the multifunctional displays 322.

A particular feature of the subject invention is that the multifunctional displays 322 are adapted to be substantially invisible unless and until they are controlled by the system indication and control processor 320 to be illuminated. In this manner, the pilot is not inundated with meaningless information, but, instead, is only apprised of the operational status of the cabin pressurization system and/or the breathing system when such status appraisal s desirable, required or necessary. Accordingly, when the system indication and control processor 320 operates to illuminate a desired display, the display is more likely to be noticed by the pilot and, accordingly, the necessary action taken. Further, using a plurality of formats for the light indicators provides more information to the pilot upon which his decision to act may be based inasmuch as each format conveys information apprising the pilot of the relative degree of an emergency.

With reference to FIG. 6a, a flow chart is provided for illustrating software for operating the system indication and control processor 320 to provide the desired indications to the pilot of the aircraft. The flow charts illustrated in FIG. 6a provide sufficient guidance to allow one skilled in the art of programming to easily program a conventional microprocessor, thereby implementing the system indication and control processor 320. The cabin pressurization system 300 provides a signal to the system indication and control processor 320 which is indicative of the pressurization of the cabin. The system indication and control processor 320 determines whether the actual effective cabin altitude, i.e., the altitude at which the atmospheric pressure equals the actual cabin pressure, as indicated by the pressurization of the cabin, is greater than, or less than, the desired effective altitude (as indicated by the altitude of the aircraft by sensor 324 and in accordance with the graph of FIG. 1), decisions 600–602. As used herein, "cabin altitude" refers to the actual, effective cabin altitude and "desired altitude" refers to the effective desired altitude. It will be apparent to those skilled in the art that the desired altitude "H" referenced by decision 600 is different from the desired altitude "L" referenced by decision 602 so that tolerance range illustrated in FIG. 1 may be implemented.

If the cabin altitude is not greater than, or less than, the desired altitude, then the cabin pressurization is acceptable, i.e., no action is required, and the system indication and control processor 320 continues to monitor the signal provided by the cabin pressurization system 300. Should the cabin altitude be less than the desired altitude, indicating that the cabin is in a high-pressure condition, then a maintenance "MNX" light indicator is illuminated, action 604, on the multifunctional displays 322 to indicate that the cabin pressurization system 300 should be checked for malfunction. The MNX display, by itself, does not indicate that any immediate action need be taken by the pilot.

It will be apparent to those skilled in the art that the desired altitude high (i.e., decision 600) and the desired altitude low (i.e., decision 602) will vary with the measured altitude of the aircraft, as illustrated by the graph of FIG. 1. Further, it will become apparent to those skilled in the art that the system indication and control processor 320 will only provide system malfunction indicators to the pilot when the cabin altitude is greater than the desired altitude, i.e., when the aircraft cabin is in a low-pressure condition, as indicated by decision 600.

Figure 4:
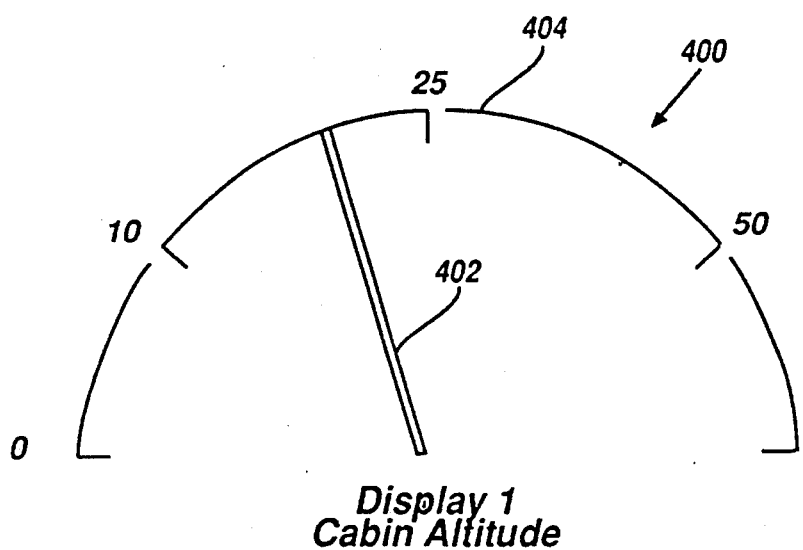
FIG. 4 is an illustration of the preferred pressurization indicator of the invention.
Figure 5:
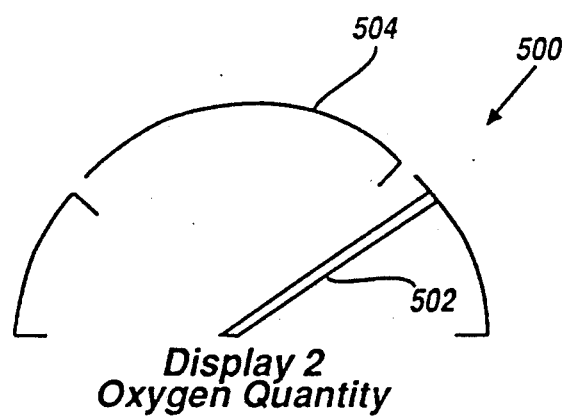
FIG. 5 is an illustration of the preferred oxygen quantity indicator of the invention.

When such a low-pressure condition is indicated the maintenance display is illuminated, action 606, and the extent of the malfunction is determined, decisions 608 and 610. If the cabin altitude is less than a first predetermined maximum (25,000 feet in the presently preferred embodiment of the invention) then a "CABIN PRESSURE" light indicator is illuminated in a first format to indicate a non-critical failure, i.e., an advisory condition, action 612. As illustrated in FIG. 6b, action 612 is to illuminate the cabin pressure display indicator in the white color format. If the cabin pressurization is greater than 25,000 feet but less than a second predetermined value (50,000 feet in the presently preferred embodiment of the invention), decision 610, then the quantity indicator of FIG. 4 is illuminated to thereby indicate the cabin altitude (pressurization), action 614 and the cabin pressure display indicator is illuminated in the second color format, action 616. With further reference to FIG. 6b, the second color format refers to illumination of the indicator in an amber color, thereby to indicate a caution condition. If the cabin altitude is greater than 50,000 feet, then the quantity indicator of FIG. 4 is illuminated, action 618, and the cabin pressure indicator is illuminated in the third color format, i.e., the red color format indicating an emergency, action 620.

The system indication and control processor 320 constantly monitors the status signal provided by the cabin pressurization system 300 and the altitude signal provided by the altitude sensor 324 to determine the status of the aircraft and control the multifunctional displays 322 to indicate that status in accordance with the decisional diagram of FIG. 6a. Accordingly, should the effective cabin altitude fall below 50,000 feet, then the CABIN ALTITUDE indicator will no longer be displayed in the red color format.

It will be apparent to those skilled in the art that the first and second predetermined values of 25,000 and 50,000 feet have been chosen for their relevance to the physiological affect which those altitudes have on the pilot. That is, below 25,000 feet the pilot is apprised that the cabin pressurization system has malfunctioned and maintenance is required. However, because no adverse physiological affects will be present at this low altitude, no further action need be taken and, accordingly, no further action is indicated. Between 25,000 and 50,000 feet the pilot's reaction time and ability to make decisions are adversely affected, thereby requiring the pilot to determine whether to lower his altitude and/or abort his mission. Accordingly, the amber light is provided, indicating the need to make the subject decision, and the digital quantity indicator is provided to give the pilot detailed information concerning his altitude so that the decision can be made. Above 50,000 feet the pilot must act immediately, as potential exists that he will blackout leading to loss of the aircraft and pilot. The pressure indicator provided in the red format informs the pilot of the need to immediately reduce his altitude.

The system indication and control processor 320 further monitors a signal from the breathing system controller 304 to determine the operational status of the on-board oxygen generation system 308 as well as the quantity of oxygen remaining in the standby oxygen source 310. From this information the system indication and control processor 320 selectively provides system status information to the pilot in accordance a program of instructions operating the processor 320, as illustrated in the flow charts of FIGS. 7a, 7b and 7c. As explained above, one skilled in the art of programming can readily program a conventional microprocessor from the flow charts of FIGS. 7a, 7b and 7c.

Figure 7A:
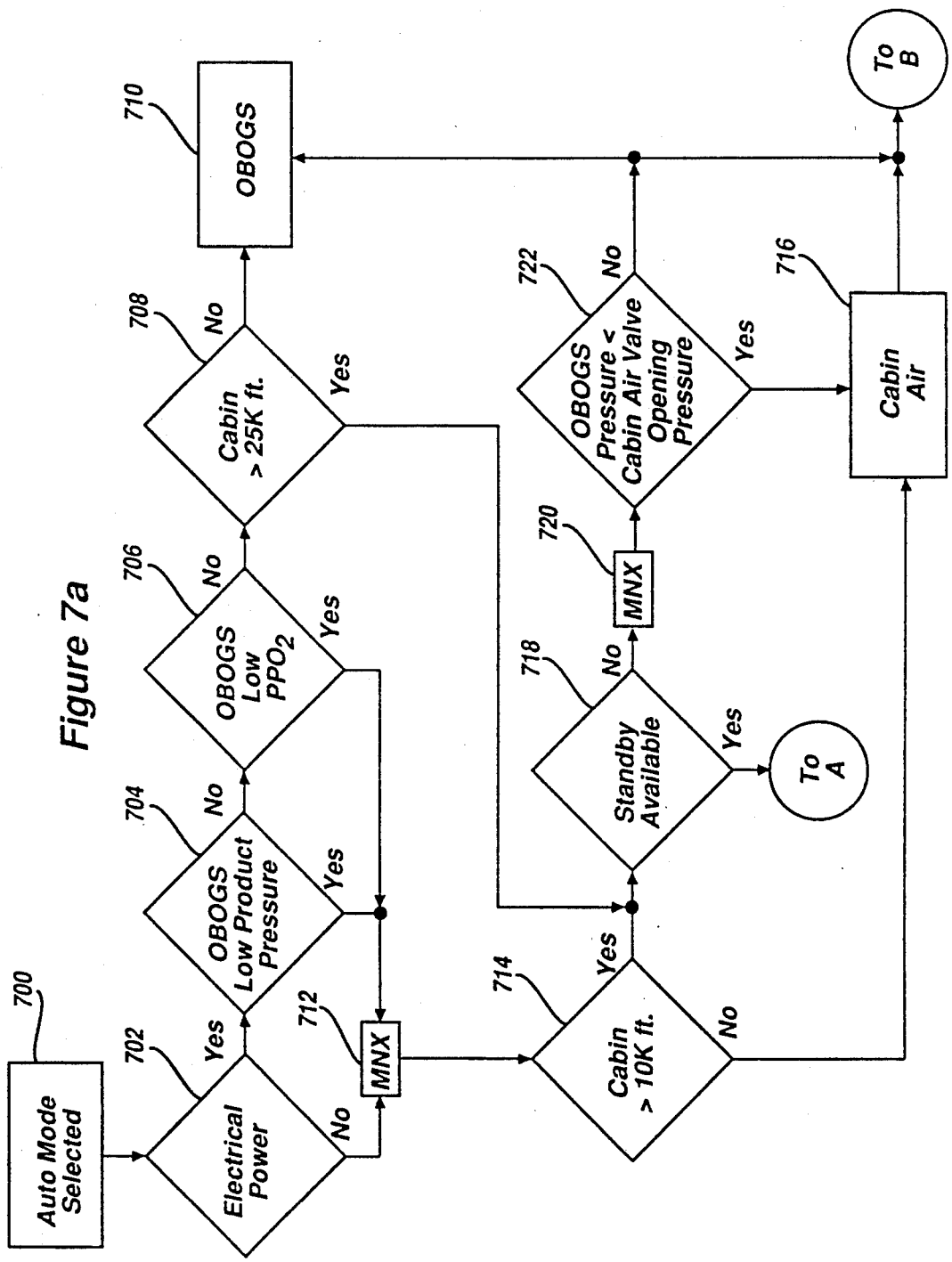

A particularly advantageous feature of the subject invention is that the pilot may select an automatic mode whereby the breathing system controller 304 automatically controls the breathing gas selector valve to supply oxygen to the pilot from either oxygen source 308-312 so that the pilot's breathing gas oxygen concentration will be maintained within the tolerances illustrated by the graph of FIG. 2. Alternatively, the pilot may select a manual mode whereby he determines from which source he will receive standby oxygen. With reference to FIG. 7a, action 700 indicates that the pilot has selected the automatic mode such that breathing gas will be automatically supplied as described herein.

The breathing system controller 304 executes a plurality of decisions 702-708 to determine whether the on-board oxygen generation system is operational and, if so, to supply breathing gas to the pilot from the on-board oxygen generation system, action 710. The on-board oxygen generation system of the presently preferred embodiment of the invention operates on electrical power. Therefore, to determine the operational status of the system, the electrical power source is monitored, decision 702. If electrical power is not available, the maintenance indicator is illuminated, action 712. Since the on-board oxygen generation system 308 will not operate without electrical power an alternative source of breathing gas must be selected, as will be described more fully below.

The on-board oxygen generation system is also monitored to determine whether its output breathing gas pressure is low and, if so, the maintenance indicator is illuminated, action 712. When the output pressure of the on-board oxygen generation system 308 is below a predetermined minimum value (10 pounds per square inch in the preferred embodiment of the invention) then the breathing demand regulator 316 will not work and, like failure of electric power, an alternate source of breathing gas must be selected. Accordingly, under both of these failure conditions, the system indication and control processor 320 will select an alternate supply for the pilot's breathing gas.

In determining whether to provide breathing gas to the pilot from the on-board oxygen generation system 308, the breathing system controller 304 also determines whether the partial pressure of oxygen (PPO$_2$) is below a predetermined minimum value. The partial pressure of oxygen is the pressure at which oxygen is supplied from the oxygen generating portion of the on-board oxygen generation system 308 and is indicative of the percentage of oxygen being supplied by the on-board oxygen generation system 308. If this percentage is low, in accordance with the graph of FIG. 2, then an alternate source of oxygen must be selected.

In any one of the three foregoing conditions, the alternate source may be cabin air if the aircraft cabin is below 10,000 feet. Accordingly, the breathing system controller 304 makes this determination, decision 714, and if the cabin is below 10,000 feet, then cabin air is provided as the breathing gas, action 716 and warning indications are provided, as will be described below.

The last check which the breathing system controller 304 makes to determine whether breathing gas should be supplied by the on-board oxygen generation system 308 is to determine whether the cabin altitude, as determined by the cabin pressurization, is greater than 25,000 feet, decision 708. If the cabin pressurization is not greater than 25,000 feet and the remaining checks 702–706 continue to be satisfactory, then breathing gas is supplied to the pilot from the on-board oxygen generation system, action 710. If the cabin altitude is greater than 25,000 feet, decision 708, then the breathing system controller 304 will attempt to provide breathing gas to the pilot from the standby oxygen source 310, decision 718. Also, if either condition 702 through 706 is unsatisfactory and the cabin altitude is greater than 10,000 feet, decision 714 (discussed above), then the breathing system controller 304 will also attempt to provide breathing gas to the pilot from the standby oxygen source, decision 718.

In the event no standby oxygen is available, decision 718, then a maintenance indicator is illuminated, action 720 so that the standby oxygen source may be refilled. The output pressure of the on-board oxygen generation system is checked to determine whether it is less than the cabin air valve opening pressure to thereby determine whether the on-board oxygen generation system 308 may supply breathing gas to the pilot on an emergency basis. If the on-board oxygen generation system output pressure is greater than the cabin air valve opening pressure, then breathing gas is supplied to the plot from the on board oxygen generation system and indications are provided to the pilot as though the pilot were breathing cabin air, as will be described in more detail below. If the on-board oxygen generation system output pressure is less than the cabin air valve opening pressure, then cabin air is provided to the pilot, action 716, and indications are provided to the pilot in accordance with the diagram of FIG. 7c.

FIG. 7b is a flow chart illustrating the software for the indications which are provided to the pilot when the standby oxygen source is provided as the breathing gas as discussed above by reference to decision 718. The standby supply is provided to the pilot, by proper control of the breathing gas selector valve 314, action 724. If the quantity of oxygen remaining in the standby source 310 is below a predetermined quantity, decision 726, then the "OXY LOW" indicator is provided in the amber format and a maintenance indicator is illuminated, actions 728 and 730. If the cabin altitude is less than 25,000 feet, decision 732, then the oxygen quantity indicator 500 (display 2) is illuminated, action 734, and the "OXYGEN" indicator is illuminated in the amber color format, action 736. The oxygen indicator in this format indicates to the pilot that his breathing gas source must be monitored. If the cabin altitude is greater than 25,000 feet, then both the pressurization quantity indicator 400 (display 1) and the oxygen quantity indicator 500 are illuminated, actions 738 and 740 and the oxygen indicator is provided in the amber format.

It will be apparent to those skilled in the art that the flow charts of FIGS. 7a, 7b and 7c, like the flow chart of FIG. 6a, are only illustrative of conditions which must exist before particular action is taken, however, once action is taken, a change of conditions may merit a change of display. As an example, when the cabin is above 25,000 feet, and initially the quantity of standby oxygen is not low, then the displays 1 and 2 will be provided along with the oxygen indicator, actions 738–742. If, after passage of time the quantity of standby oxygen falls below a predetermined minimum, the OXY LOW indicator will also be provided, action 730, in addition to the displays 738 and 740 and the OXYGEN indicator, action 742. Similarly, if the cabin altitude falls below 25,000 feet, then the display 1 will be removed.

FIG. 7c illustrates the software for programming the processor 320 to operate the warning displays which are provided when cabin air is supplied to the pilot as the breathing gas. If the altitude of the cabin is less than 10,000 feet, decision 744, then the pressurization display is illuminated, action 746 and the oxygen indicator is provided in the advisory, white format, action 748. If the cabin altitude is greater than 10,000 feet and less than 25,000 feet, then both the pressurization indicator 400 and the oxygen quantity indicator 500 are provided, actions 750 and 752, and the oxygen indicator and OXY LOW indicator are provided in the amber color format, action 754 and 756. If the cabin altitude is greater than 25,000 feet then both the pressurization display 400 and the oxygen quantity display 500 are illuminated, action 758 and 760, the oxygen indicator is provided in the red color format, action 762, and the OXY LOW indicator is provided in the amber color format, action 764.

Again, it should be apparent to those skilled in the art that if the OBOGS output pressure is initially low and the cabin altitude is less than 10,000 feet, cabin ar will be supplied, action 716 and the pressurization display 400 and oxygen indicator illuminated, action 746 and 748. If, after passage of time, the cabin altitude rises above 10,000, then the standby oxygen source will be checked, action 718, as described above. This may result in either the standby oxygen source being provided or cabin air continuing to be provided to the pilot. In either case the warnings which will be provided will change.

Figure 8:
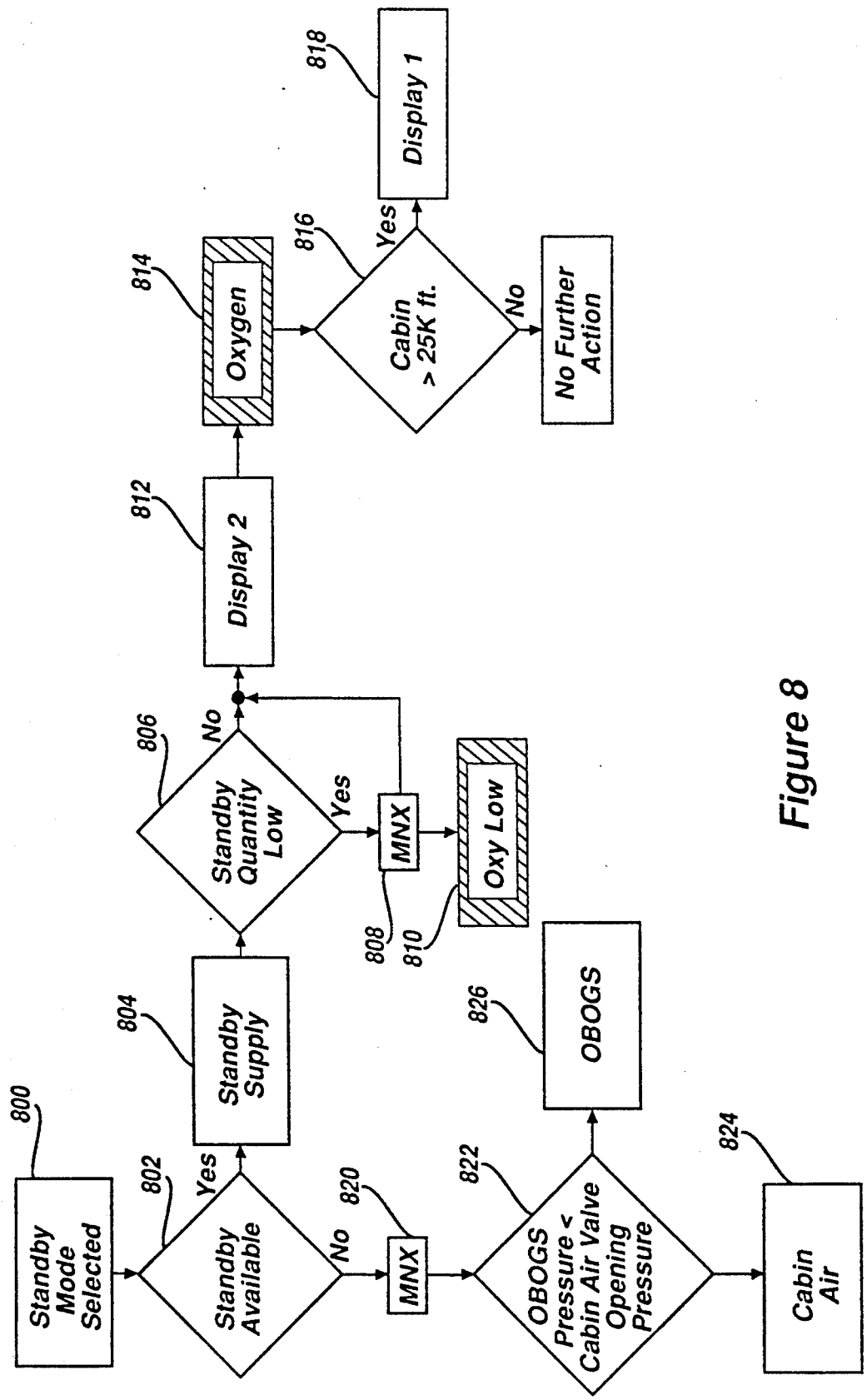
FIG. 8 is a flow chart illustrating software for illuminating the warning indicators when the pilot has manually selected his breathing gas.

FIG. 8 is a flow chart of the software for operating the processor 320 to provide breathing gas to the pilot when the pilot manually selects oxygen to be supplied from the standby oxygen source, action 800. Such a selection may be a result of the CABIN PRESSURE indicator being illuminated in the red color format, as described by reference to FIG. 6a. When the standby mode is selected and standby oxygen is available, decision 802, then breathing gas is supplied to the pilot from the standby oxygen source 310, action 804. If the quantity of oxygen remaining in the standby source is low, decision 806, then a maintenance indicator is provided, action 808 and the OXY LOW indicator is illuminated in the amber color format, action 810. When oxygen is being supplied from the standby oxygen source, the oxygen quantity indicator 500 is illuminated and the oxygen indicator is also illuminated in the amber color format, actions 812 and 814. In addition, if the cabin altitude is greater than 25,000 feet, decision 816, then the pressurization indicator is also illuminated, action 818.

If the pilot has selected the standby oxygen source, action 800, but standby oxygen is not available, decision 802, then a maintenance indicator is illuminated, action 820. The breathing system controller 304 will thereafter override the pilot's standby selection and provide breathing gas to the pilot from the most appropriate source, as discussed above. In this regard, the on-board oxygen generation system pressure is compared to the cabin air valve opening pressure, decision 822, and either cabin air is provided as the breathing gas, action 824, or breathing gas is supplied to the pilot from the on-board oxygen generation system, action 826. In either case, warnings are provided to the pilot in accordance with the diagrams of FIGS. 7a, 7b and 7c.

Although only several presently preferred embodiments of our novel method and apparatus have been described in detail herein, many modifications and variations thereof will readily become apparent to those skilled in the art. It is our intentions, by the appended claims, to embody all such modifications and variations.

We claim:

1. An apparatus for warning the pilot of an aircraft of any failures in the life-support system of the aircraft, wherein the life-support system includes at least first and second oxygen sources and a pressurization system, said apparatus comprising multifunctional display means for selectively providing a plurality of display indicators in response to the operational status of the life-support system, said multifunctional display means being further adapted to provide at least one of said display indicators in a plurality of color formats, said multifunctional display means further including memory means for storing program and control data, said multifunctional display means being responsive to the program data and the status of the life-support system to determine when one or more of said plurality of display indicators are to be displayed and to determine when, and in what format, said at least one display indicator is to be displayed, the program data including a first portion which contains information for controlling said multifunctional display means when the pilot is receiving oxygen from the first oxygen source, said multifunctional display means being further responsive to the life-support system to determine whether oxygen is being supplied to the pilot from the first oxygen source and, if so, to selectively display a portion of said display indicators in accordance with the first portion of the program data, and the program data including a second portion which contains information for controlling said multifunctional display means when the pilot is receiving oxygen from the second oxygen source, said multifunctional display means being further responsive to the life-support system to determine whether oxygen is being provided to the pilot from the second oxygen source and, if so, to selectively display a portion of said display indicators in accordance with the second portion of the program data.

2. The apparatus as recited in claim 1 wherein the program data includes a third portion which contains information for controlling said multifunctional display means when the pilot is receiving oxygen from the cabin of the aircraft, said multifunctional display means being further responsive to the life-support system to determine whether oxygen is being provided to the pilot from the cabin and, if so, to selectively display a portion of said display indicators in accordance with the third portion of the program data.

3. The apparatus as recited in claim 1 wherein the life-support system includes switch means responsive to the input from the pilot for manually selecting oxygen from the second oxygen source, and wherein the program data includes a fourth portion which contains information for controlling said multifunctional display means when the pilot has manually selected oxygen from the second oxygen supply via said switch means, said multifunctional display means being further responsive to said switch means to selectively display a portion of said display indicators in accordance with the fourth portion of the program data.

4. The apparatus as recited in claim 1 wherein at least one of said display indicators comprises digital quantity indicator means for graphically indicating a quantity measured by the life-support system.

5. The apparatus as recited in claim 1 wherein the control data includes a first predetermined pressure level and wherein the program data includes a fifth portion which includes information for controlling said multifunctional display means when the cabin pressure is below the first predetermined pressure level, said multifunctional display means including means for determining whether the cabin pressure is below the first predetermined pressure level and, if so, to selectively display a portion of said display indicators in accordance with the fifth portion of the program data.

6. The apparatus as recited in claim 1 wherein at least one display format of said at least one display indicator indicates an emergency condition which requires immediate action, said multifunctional display means being further responsive to the program data for display of said at least one indicator in the at least one display format when the emergency condition is present.

7. An apparatus for maintaining the life-support environment of the cabin of an aircraft and for warning the pilot of the aircraft of any environmental hazards said apparatus comprising:
first oxygen source means for generating oxygen to be supplied to the pilot, said first oxygen source means being adapted to generate concentrated oxygen from air outside the cabin and to provide a first oxygen source signal indicative of the operational status of said first oxygen source means;
second oxygen source means for storing a supply of oxygen to be supplied to the pilot, said second oxygen source means being adapted to provide a second oxygen source signal indicative of the quantity of oxygen remaining in its store;
breathing gas supply means for supplying breathing gas to the pilot, said breathing gas supply means being responsive the first and second oxygen source signal to supply oxygen from said first oxygen source means to said pilot at times when said first oxygen source means is operational and to supply oxygen to said pilot from said second oxygen source means when said first oxygen source means is not operational and said second oxygen source means has oxygen remaining therein;
pressurization system means for maintaining the pressure of the cabin at predetermined desired levels, the desired level being determined at least in part by the altitude of the cabin, said pressurization system means being adapted to supply cabin pressure and cabin altitude signals indicative of the pressure and altitude of the cabin, respectively; and multifunctional display means responsive to cabin pressure and cabin altitude signals and the first and second oxygen source signals for selectively providing first and second quantity indicators which indicate the altitude of the cabin and the amount of oxygen remaining in said second oxygen source means, respectively, and for selectively providing a cabin pressure indicator and first and second oxygen indicators wherein said cabin pressure and said first and second oxygen indicators may each be provided in first, second and third display formats, and wherein each display format indicates a different status of said cabin pressure and said first and second oxygen indicators, said cabin pressure indicator and said first and second oxygen indicators, said multifunctional display means being further responsive to the cabin pressure and cabin altitude signals and the first and second oxygen source signals to display said cabin pressure indicator and said first and second oxygen indicators in the first, second or third display format.

8. The apparatus as recited in claim 7 wherein said multifunctional display means further comprises means for determining the effective cabin altitude from the cabin pressure signal, said multifunctional display means being adapted to display said first quantity indicator when the effective cabin altitude is above a first predetermined cabin altitude.

9. The apparatus as recited in claim 7 wherein said multifunctional display means is further responsive to the first oxygen source signal to determine whether oxygen is being supplied to the pilot from said first oxygen source means and, if not, to selectively display said first and second oxygen indicators.

10. The apparatus as recited in claim 9 wherein said multifunctional display means is further responsive to the second oxygen source signal to determine whether oxygen is being provided to the pilot from said second oxygen source and, if not, to selectively display said first and second oxygen indicators.

11. The apparatus as recited in claim 7 wherein said second oxygen source means includes means responsive to input from the pilot for manually selecting oxygen from said second oxygen source means, said multifunctional display means being further responsive to the manual selection of said second oxygen source means to selectively display said first and second quantity indicators and said first and second oxygen indicators.

12. The apparatus as recited in claim 7 wherein said multifunctional display means further comprises memory means for storing program and control data, the program data being responsive to the status of the first and second oxygen source signals and the cabin pressure and cabin altitude signals to determine when the first and second quantity indicators are to be displayed and to determine when, and in what format, the first and second oxygen indicators are to be displayed.

13. The apparatus as recited in claim 12 wherein said multifunctional display means further comprises means for determining the effective cabin altitude from the cabin pressure signal, said multifunctional display means being adapted to display said first quantity indicator when the effective cabin altitude is above a first predetermined cabin altitude.

14. The apparatus as recited in claim 12 wherein said multifunctional display means is further responsive to the first oxygen source signal to determine whether oxygen is being supplied to the pilot from said first oxygen source means and, if so, to selectively display said first and second oxygen indicators in accordance with a first portion of the program data.

15. The apparatus as recited in claim 14 wherein said multifunctional display means is further responsive to the second oxygen source signal to determine whether oxygen is being provided to the pilot from said second oxygen source and, if so, to selectively display said first and second oxygen indicators in accordance with a second portion of the program data.

16. The apparatus as recited in claim 15 further including means is further responsive to the first and second oxygen source signals to determine whether oxygen is being provided to the pilot from the cabin and, if so, to selectively display said first and second oxygen indicators in accordance with a third portion of the program data.

17. The apparatus as recited in claim 15 wherein said second oxygen source means includes means responsive to input from the pilot for manually selecting oxygen from said second oxygen source means, said multifunctional display means being further responsive to the manual selection of said second oxygen source means to selectively display said first and second quantity indicators and said first and second oxygen indicators in accordance with a third portion of the program data.

18. An apparatus for maintaining the life-support systems of the cabin of an aircraft and for warning the pilot of the aircraft of any life-support failures, said apparatus comprising:

a cabin pressure sensor for determining the ambient air pressure of the cabin of the aircraft and providing a cabin pressure signal indicative of the determined cabin air pressure;

a cabin altitude sensor for determining the altitude of the aircraft cabin and for providing a cabin altitude signal indicative of the determined cabin altitude;

a pressurization system responsive to the cabin pressure and cabin altitude signals for determining a desired cabin pressure and maintaining the cabin air pressure substantially at the desired value;

a cabin oxygen sensor for determining the concentration of oxygen in the air of the cabin and for providing a cabin oxygen signal indicative of the concentration of oxygen in the cabin air;

a breathing mask adapted to be positioned on the face of the pilot of the aircraft to provide oxygen to the pilot;

first and second oxygen sources for providing oxygen to the cabin of the aircraft, said first oxygen source being adapted to generate concentrated oxygen from air outside the cabin and to provide a first oxygen source signal indicative of the operational status of said first oxygen source and said second oxygen source being adapted to provide concentrated oxygen from a quantity of stored oxygen and to provide a second oxygen source signal indicative of the quantity of oxygen available to the pilot;

a breathing gas selector valve coupled to receive oxygen from said first oxygen source, said second oxygen source and the cabin, said breathing gas selector valve being responsive to a breathing control signal for providing oxygen to said breathing mask from either said first oxygen source, said second oxygen source or ambient air from the cabin;

a breathing system controller responsive to the cabin pressure, cabin altitude and cabin oxygen signals and responsive to the first and second oxygen source signals for providing the breathing control signal; and a multifunctional display responsive to a display signal for providing first and second quantity indicators for indicating the altitude of the cabin and the amount of oxygen remaining in said second oxygen source, respectively, sad multifunctional display being further responsive to the display signal for providing a cabin pressure indicator and first and second oxygen indicators wherein said cabin pressure and said first and second oxygen indicators may each be provided in first, second and third color formats, as determined by the display signal, and wherein each format indicates a different status of said cabin pressure and said first and second oxygen indicators;

a display controller coupled to monitor the status of the cabin pressure, cabin altitude and cabin oxygen signals and said first and second oxygen source signals to provide the display signal, said display controller being adapted to provide the display signal such that the cabin pressure indicator is provided in the first color format when the cabin pressure signal and the cabin altitude signal indicator the difference between the effective cabin altitude and the desired cabin altitude is greater than a first predetermined constant, to provide the cabin pressure indicator in the second color format when the cabin pressure signal and the cabin altitude signal indicate the difference between the effective cabin altitude and the desired cabin altitude is greater than a second predetermined constant and to provide the cabin pressure indicator when the cabin pressure signal and the cabin altitude signal indicate the difference between the effective cabin altitude and the desired cabin altitude is greater than a third predetermined constant, said display controller being adapted to provide the display signal such that said first quantity indicator to indicate the effective altitude of said cabin when the cabin pressure signal and the cabin altitude signal indicate the difference between the effective cabin altitude and the desired cabin altitude is greater than the second predetermined constant and when the breathing control signal provided by said breathing system controller controls said breathing gas selector valve to supply cabin air to said breathing mask, said display controller being adapted to provide the display signal such that said second quantity indicator is provided when the breathing control signal controls the breathing selector valve to supply oxygen from said second oxygen source to said breathing mask and when cabin air is provided to said breathing mask and the cabin pressure signal and the cabin altitude signal indicate the difference between the effective cabin altitude and the desired cabin altitude is greater than the first predetermined constant, said display controller being adapted to provide the display signal such that said first oxygen indicator is provided in the first color format when cabin air is provided to said breathing mask and when the cabin pressure signal and the cabin altitude signal indicate the difference between the effective cabin altitude and the desired cabin altitude is less than the first predetermined constant, to provide said first oxygen indicator in the second color format when oxygen is provided to said breathing mask from said second oxygen source and when cabin air is provided to said breathing mask and the cabin pressure signal and the cabin altitude signal indicate the difference between the effective cabin altitude and the desired cabin altitude is greater than the first predetermined constant but less than the second predetermined variable and to provide said first oxygen indicator in the third color format when cabin air is provided to said breathing mask and when the cabin pressure signal and the cabin altitude signal indicate the difference between the effective cabin altitude and the desired cabin altitude is greater than the third predetermined constant, said display controller being further adapted to provide the display signal such that said second oxygen indicator is provided in the second color format when oxygen is provided to said breathing mask from said second oxygen source and when the second oxygen source signal indicates the quantity of oxygen remaining is below a predetermined quantity and to provide said second oxygen indicator when cabin air is provided to said breathing mask and when the cabin pressure signal and the cabin altitude signal indicate the difference between the effective cabin altitude and the desired cabin altitude is greater than the first predetermined constant.

19. The apparatus as recited in claim 18 wherein said breathing system controller further comprises an oxygen switch for providing a source control signal, said breathing system controller being responsive to the source control signal to provide the breathing control signal to control said breathing gas selector valve to supply oxygen to said breathing mask from said second oxygen source when the second oxygen source signal indicates oxygen is available in said second oxygen source, to provide the breathing control signal to control said breathing gas selector valve to provide oxygen to said oxygen mask from said first oxygen source when the second oxygen source signal indicates that no oxygen is available in said second oxygen source and the first oxygen source signal indicates said first oxygen source is functioning properly and to provide the breathing control signal to control said breathing gas selector valve to provide cabin air to said oxygen mask when the second oxygen source signal indicates that no oxygen is available in said second oxygen source and the first oxygen source signal indicates said first oxygen source is malfunctioning.

20. The apparatus as recited in claim 19 wherein said display controller is responsive to the oxygen control signal to provide the display signal such that said first quantity indicator is displayed when oxygen is supplied to said breathing mask and the cabin pressure signal and the cabin altitude signal indicate the difference between the effective cabin altitude and the desired cabin altitude is greater than the second predetermined constant and when cabin air is supplied to said breathing mask and the cabin pressure signal and the cabin altitude signal indicate the difference between the effective cabin altitude and the desired cabin altitude is greater than the first predetermined constant, said display controller being responsive to the oxygen control signal to provide said second quantity indicator when oxygen is supplied to said breathing mask from said second oxygen source, cabin air is supplied to said oxygen mask or oxygen is supplied to said breathing mask from said first oxygen source and the cabin pressure signal and the cabin altitude signal indicate the difference between the effective cabin altitude and the desired cabin altitude is greater than the first predetermined constant, said display controller being responsive to said oxygen control signal to provide said first oxygen indicator in the second color format when oxygen is supplied to said breathing mask from said second oxygen source, when oxygen is supplied to said breathing mask from said first oxygen source and the cabin pressure signal and the cabin altitude signal indicate the difference between the effective cabin altitude and the desired cabin altitude is greater than the first predetermined constant and when cabin air is provided to said breathing mask and the cabin pressure signal and the cabin altitude signal indicate the difference between the effective cabin altitude and the desired cabin altitude is less than the third predetermined constant, said display controller being responsive to the oxygen control signal to provide said first oxygen indicator in the third color format when cabin air is supplied to said oxygen mask and the cabin pressure signal and the cabin altitude signal indicate the difference between the effective cabin altitude and the desired cabin altitude is greater than the second predetermined constant, said display controller being responsive to the oxygen control signal to provide said second oxygen indicator in the second color format when oxygen is supplied to said breathing mask from said second oxygen source and the second oxygen source signal indicates the quantity of oxygen remaining is below the predetermined quantity and when cabin air is provided to said breathing mask and the cabin pressure signal and the cabin altitude signal indicate the difference between the effective cabin altitude and the desired cabin altitude is greater than the first predetermined constant.

21. The apparatus as recited in claim 20 wherein said multifunctional display further includes a maintenance indicator and wherein said display controller is adapted to provide the display signal to control said multifunctional display to display said maintenance indicator when the cabin pressure signal and the cabin altitude signal indicate the difference between the effective cabin altitude and the desired cabin altitude is greater than the first predetermined constant, when the first oxygen source signal indicates said first oxygen source is malfunctioning or when the second oxygen source signal indicates the amount of oxygen remaining in said second oxygen source is less than the predetermined quantity.

22. The apparatus as recited in claim 21 wherein said display controller further comprises first and second oxygen remove switches, said display controller being responsive to said first oxygen remove switch for providing the display signal such that said first oxygen indicator is removed from said multifunctional display and being responsive to said second oxygen remove switch for providing the display signal such that said second oxygen indicator is removed from said multifunctional display.

23. The apparatus as recited in claim 22 wherein said display controller further comprises first and second quantity remove switches, said display controller being responsive to said first quantity remove switch for providing the display signal such that said first quantity indicator is removed from said multifunctional display and being responsive to said second quantity remove switch for providing the display signal such that said second quantity indicator is removed from said multifunctional display.

24. The apparatus as recited in claim 23 wherein said multifunctional display further comprises a cabin air indicator and wherein said display controller is adapted to provide the display signal to control said multifunctional display said cabin air indicator when cabin air is provided to said breathing mask and the cabin pressure signal and the cabin altitude signal indicate the difference between the effective cabin altitude and the desired cabin altitude is greater than the first predetermined constant.

25. The apparatus as recited in claim 24 wherein said first and second quantity indicators comprise discrete analog displays each including a plurality of indicator needles wherein the respective cabin altitude and the amount of oxygen remaining in said second oxygen source is indicated by illuminating one of said plurality of needles.

26. The apparatus as recited in claim 25 wherein said first and second oxygen indicators comprise idiot lights having the captions OXYGEN and OXY LOW, respectively, printed thereon.

* * * * *

UNITED STATES PATENT AND TRADEMARK OFFICE
CERTIFICATE OF CORRECTION

PATENT NO. : 5,022,393

DATED : June 11, 1991

INVENTOR(S) : Michael B. McGrady; Jon K. Robinson

It is certified that error appears in the above-identified patent and that said Letters Patent is hereby corrected as shown below:

In column 15, claim 18, line 14, please delete "sad" and substitute therefor -- said --.

In column 15, claim 18, line 31, please delete "indicator" and substitute therefor -- indicate --.

Signed and Sealed this

Third Day of November, 1992

Attest:

DOUGLAS B. COMER

Attesting Officer

Acting Commissioner of Patents and Trademarks